United States Patent [19]

Yamashita

[11] 4,003,633
[45] Jan. 18, 1977

[54] COLOR DISPLAY DEVICE

[75] Inventor: Akio Yamashita, Kawanishi, Japan

[73] Assignee: Matsushita Electric Industrial Co., Ltd., Kadoma, Japan

[22] Filed: Nov. 19, 1975

[21] Appl. No.: 633,395

[30] Foreign Application Priority Data

Nov. 26, 1974 Japan .............................. 49-136783

[52] U.S. Cl. .......................... 350/160 LC; 252/299
[51] Int. Cl.² ........................ G02F 1/13; C09K 3/34
[58] Field of Search .................... 252/299, 408 LC; 350/150, 160 LC

[56] References Cited

UNITED STATES PATENTS

| | | | |
|---|---|---|---|
| 3,597,044 | 8/1971 | Castellano | 350/160 LC |
| 3,703,329 | 11/1972 | Castellano | 252/299 |
| 3,833,287 | 9/1974 | Taylor et al. | 350/160 LC |
| 3,864,022 | 2/1975 | Moriyama et al. | 252/299 |
| 3,865,469 | 2/1975 | Asai et al. | 350/160 LC |
| 3,876,286 | 4/1975 | Deutscher et al. | 252/299 |
| 3,888,566 | 6/1975 | Toriyama et al. | 252/299 |
| 3,900,248 | 8/1975 | Nagasaki | 350/160 LC |

OTHER PUBLICATIONS

Ohnishi, Y., et al., Appl. Phys. Letts., vol. 24, No. 5, pp. 213–216 (3/74).

Primary Examiner—Benjamin R. Padgett
Assistant Examiner—T. S. Gron
Attorney, Agent, or Firm—Cushman, Darby & Cushman

[57] ABSTRACT

This invention relates to a novel color display device comprising a pair of electrodes, which are disposed with a specified space inbetween and at least one of which is transparent, and a liquid crystal solution filled in the space, wherein the improvement is that the liquid crystal solution contains a specified small amount of a new styryl-like color-changing compound represented by the chemical formula:

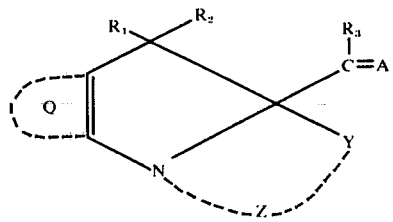

In the chemical formula; Q represents a benzene ring with or without substituted radicals and/or condensed ring(s); $R_1$ and $R_2$ represent lower alkyl radicals, hydroxyalkyl radicals or alkoxyalkyl radicals of the same or different kind; $R_3$ represents hydrogen, an alkyl radical, alkoxy radical, halogen, a nitrile radical, an aromatic radical or a phenoxy radical; Y represents oxygen (O) or sulfur (S); Z represents an alkylene radical of 2 to 4 carbon atoms with or without alkyl substitution radical(s), necessary to form a ring structure together with

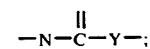

A represents a condensation reaction residue of an aromatic aldehyde, heterocyclic aldehyde, aromatic nitroso compound, or heterocyclic nitroso compound.

7 Claims, 2 Drawing Figures

COLOR DISPLAY DEVICE

BACKGROUND OF THE INVENTION

This invention relates to a new color display device.

Hitherto, among color display devices employing a liquid crystal, devices containing a dichroism dye as indophenol-blue in the liquid crystal are known. In such conventional devices, the color display is made as follows:

Light absorption by the dye molecule occurs when the molecular axis of the dye molecule is parallel to the electric vector of incident polarized rays, thereby displaying specific color of the dye. On the other hand, when the molecular axis of the dye molecule is perpendicular to the electric vector of the incident polarized rays, almost no absorption of light which passes through the dye occurs. In such a conventional device, the molecular structure of the dye is constant regardless of application or removal of the electric field to the liquid crystal.

Also, in the abovementioned conventional device, the color display is made by the absorption of polarized rays, and therefore, due to the observation of the polarized rays the color is not sufficiently pure and the view point is limited to a specified angle range.

In another conventional color display device, color has been displayed by employing a nematic liquid crystal and a polarizing prism or polarizing filter having a light axis perpendicular to that of the nematic liquid crystal. In such device also, due to employment of the polarized light, the color purity is not sufficient, and the view angle is limited.

In the abovementioned prior art the contrast of displays between electrified and non-electrified states reaches only about 10:1.

SUMMARY OF THE INVENTION

The present invention relates to an improvement in a color display device comprising a glass cell having a pair of electrodes, one of which is transparent, and a liquid crystal solution filled in the space between the electrodes, wherein the improvement is in the content of the liquid crystal solution.

This invention purports to provide color display devices capable of displaying clear color which can be easily observed without a polarizing prism or filter or limited view angle.

DETAILED DESCRIPTION OF THE INVENTION

Figure 1:
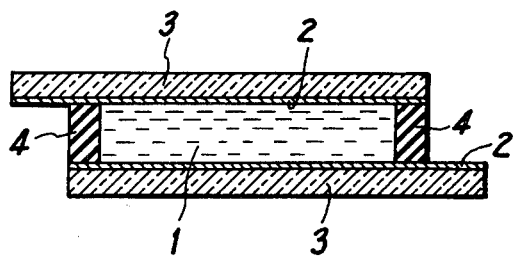
FIG. 1 is a sectional sideview of one example of the color display device embodying the present invention.

The color display device of the present invention comprises a pair of electrodes, which are held with a specified space inbetween and at least one of which is transparent, and a liquid crystal solution filled in the space, the improvement therein being that the liquid crystal solution contains a specified small amount of a new styryl-like color-changing compound represented by the chemical formula:

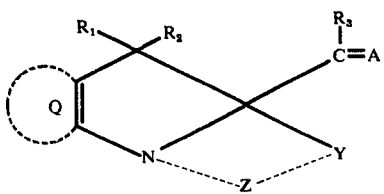

In the chemical formula: Q represents a benzene ring with or without substituted radicals and/or condensed ring(s); $R_1$ and $R_2$ represent lower alkyl radicals, hydroxyalkyl radicals or alkoxyalkyl radicals of the same or different kind; $R_3$ represents hydrogen, an alkyl radical, alkoxy radical, halogen, a nitrile radical, an aromatic radical or a phenoxy radical; Y represents oxygen (O) or sulfur (S); Z represents an alkylene radical of 2 to 4 carbon atoms with or without alkyl substitution radical(s), necessary to form a ring structure together with

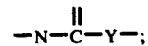

A represents a condensation reaction residue of an aromatic aldehyde, heterocyclic aldehyde, aromatic nitroso compound, or heterocyclic nitroso compound.

It has been empirically found that any of the following aromatic aldehydes can be used as the aforementioned aromatic aldehyde: benzaldehyde, p-acetaminobenzaldehyde, p-bromobenzaldehyde, m-bromobenzaldehyde, o-bromobenzaldehyde, p-dimethylaminobenzaldehyde, p-diethylaminobenzaldehyde, p-dibutylaminobenzaldehyde, o-chlorobenzaldehyde, p-chlorobenzaldehyde, p-anis-aldehyde, o-anis-aldehyde, p-tolu-aldehyde, m-tolu-aldehyde, o-tolu-aldehyde, o-ethoxybenzaldehyde, p-ethoxybenzaldehyde, p-fluorobenzaldehyde, o-fluorobenzaldehyde, p-nitrobenzaldehyde, m-nitro-benzaldehyde, o-nitro-benzaldehyde, p-cyanobenzaldehyde, o-cyanobenzaldehyde, 2,4-dichlorobenzaldehyde, 2,6-dichlorobenzaldehyde, 3,4-dichlorobenzaldehyde, 3,5-dichlorobenzaldehyde, 2,4-dimethoxybenzaldehyde, 2,5-dimethoxybenzaldehyde, 2,3-dimethoxybenzaldehyde, 3,5-dimethoxybenzaldehyde, 2,4-dimethylbenzaldehyde, 2,5-dimethylbenzaldehyde, 3,4-dimethylbenzaldehyde, 3,5-dimethylbenzaldehyde, veratraldehyde(3,4-dimethoxybenzaldehyde), 4-iospropylbenzaldehyde, o-(2-chloroethyl)benzaldehyde, 2,4,6-trimethylbenzaldehyde (mesitaldehyde), 2,4,6-triethoxybenzaldehyde, 3,4-dimethyl-p-anisaldehyde, 2,5-dimethyl-p-anisaldehyde, 2-chloro-5-nitrobenzaldehyde, 2-chloro-6-nitrobenzaldehyde, 2-chloro-3-nitrobenzaldehyde, 5-chloro-2-nitrobenzaldehyde, vanillin, o-vanillin, isovanillin, 5-bromo-vanillin, 2-chloro-4-dimethylaminobenzaldehyde, 2-chloro-6-fluorobenzaldehyde, 5-bromo-veratraldehyde, 6-bromo-veratraldehyde, 5-bromo-2-methoxy-benzaldehyde, 1-naphthaldehyde, 2-naphthaldehyde, p-dimethylamino-cinnamaldehyde, p-diethyl-cinnamaldehyde, p-nitro-cinnamaldehyde, o-nitro-cinnamaldehyde, 2-chloro-cinnamaldehyde, 9-anthraldehyde, 10-chloro-9-anthraldehyde, 9-phenanthrene-carboxaldehyde and fluorencarboxaldehyde.

It has been empirically found that any of the following aromatic nitroso compounds can be used as the aforementioned aromatic nitroso compound: p-dimethylaminonitrosobenzene, p-diethylaminonitrosobenzene, p-methyl-nitrosobenzene(p-nitrosotoluene), p-nitro-nitrosobenzene, o-nitro-nitrosobenzene, and 3-nitroso-2-nitrotoluene.

It has been empirically found that any of the following heterocyclic aldehydes can be used as the aforementioned heterocyclic aldehyde; furfural, 5-methylfurfural, 5-bromofurfural, 4-isopropylfurfural, 2-thiophene-carboxaldehyde, 5-methyl-thiophene-carboxaldehyde, 3-methoxybenzothiophene-2-carboxaldehyde, 2-pyridinecarboxaldehyde, 3-pyridinecarboxaldehyde, 4-pyridinecarboxaldehyde, 1-ethylindole-3-carboxaldehyde, 1-methylindole-3-carboxaldehyde, 1-methyl-2-phenylindole-3-carboxaldehyde, N-methylcarbazole-2-carboxaldehyde, N-ethyl-7-bromo-carbazole-2-carboxaldehyde, N-(n-octyl)-7-nitro-carbazole-2-carboxaldehyde, benzofuran-2-carboxaldehyde, dibenzofuran-2-carboxaldehyde, pyrrole-2-aldehyde, N-methylpyrrole-2-aldehyde, N-phenylpyrrole-2-aldehyde, 3-methylpyrrole-2-aldehyde, 2-ethyl-pyrrole-5-aldehyde, benzothiazole-2-aldehyde, 6-methylbenzothiazole-2-aldehyde, 6-chlorobenzothiazole-2-aldehyde, 5-chlorobenzothiazole-2-aldehyde, 6-methoxybenzothiazole-2-aldehyde, 5,6-dichlorobenzothiazole-2-aldehyde, benzoselenazole-2-aldehyde, 6-methoxybenzoselenazole-2-aldehyde, 2,4-dimethylpyrrole-2-aldehyde, 4,6-dichloro-pyrimidine-5-carboxaldehyde, 2-formyl-4,6-dimethylpyrimidine, quinoline-2-aldehyde, acridine-10-aldehyde, 2,4-diphenyl-5,6,7-hexahydrobenzopyran-8-carboxaldehyde and 2,4-diphenyl-6-methyl-5,6,7-pentahydrobenzopyran-8-carboxaldehyde.

It has been empirically found that any of the following heterocyclic nitroso compounds can be used as the aforementioned heterocyclic nitroso compounds: 3-nitrosoindole, 2-methyl-3-nitrosoindole (3-nitrosomethylketol) and 3-nitroso-2-phenylindole.

In the following, the method of preparing the novel styryl-like compounds are shown:

The styryl-like compounds can be easily prepared by a dehydrating condensation reaction of a methyl radical or methylene radical in the 2nd-position of an indoline derivative represented by the following general formula [II]:

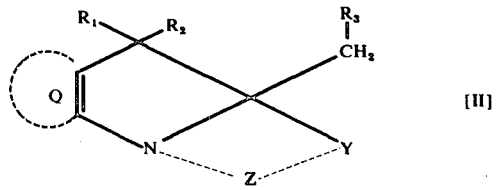

[II]

and of the aldehyde radical of an aromatic or heterocyclic aldehyde or the nitroso radical of an aromatic or heterocyclic nitroso compound, and also by a treatment of styryl dyes represented by the following general formula [III]:

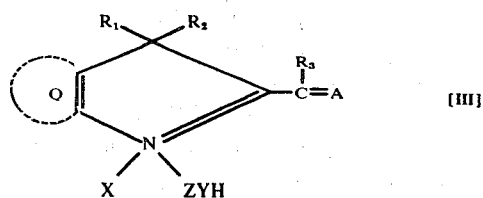

[III]

with alkali.

Further details of these methods are as follows:

a. When the abovementioned starting materials (namely, the indoline derivative and an aromatic or heterocyclic aldehyde or an aromatic or heterocyclic nitroso compound) are treated according to either of the following procedures, the styryl-like compound represented by the general formula [I] can be obtained:

1. The starting materials are heated to melt in the presence or in the absence of an alkaline catalyst without any solvents.
2. The starting materials are heated to reaction a non-polar solvent.
3. The starting materials are heated to reaction in an aprotic type polar solvent.
4. The starting materials are reacted in the presence of an alkaline catalyst in a protonic type solvent.
5. The starting materials are reacted in the presence of an alkaline catalyst, in a non-polar solvent, in an aprotic type polar solvent or in a mixture thereof.
6. The starting materials are reacted in a protonic type polar solvent.

b. When the abovementioned starting materials (i.e., the indoline derivative and the aldehyde or nitroso compound) are reacted in the absence of an alkaline catalyst, in a protonic type solvent or in a mixed solvent consisting of a protonic type solvent and at least one solvent selected from the group of non-polar solvents and aprotic type polar, solvents, then the following two results occur:

1. The intended compound represented by the general formula [I] is obtained, and
2. A mixture of the intended compound represented by the general formula [I] and a by-product (dye) represented by the general formula [III] is obtained. From the mixture, the respective compounds can be easily isolated from each other by treating the mixture with a fractionating solvent such as ether, benzene, ethyl acetate, n-hexane, cyclohexane, etc.

c. When the abovementioned starting materials (i.e., the indoline derivative and the aldehyde or nitroso compound) are made to react with each other in acetic anhydride, acetic acid or mixture thereof, then the styryl dye of indolenium type represented by the general formula [III]is obtained. In such case, by adding an alkaline agent in the mixture of the staring materials or by dissolving the isolated crude product in a suitable solvent and subsequently adding an alkaline agent thereto, and, if necessary, by further heating the mixture, the desired compound represented by the general formual [I] can be obtained.

d. When both the desired compound and the styryl dye of indolenium type are produced by the reaction between the abovementioned starting materials (i.e., the indoline derivative and the aldehyde or nitroso compound) in a protonic type solvent or a mixed solvent containing such protonic type solvent in the absence of an alkaline agent, then the desired compound can be obtained by adding an alkaline agent into the reaction system or a solution formed by dissolving the mixture separated from the reaction system in a suitable solvent and if necessary, subsequently, heating the reacting system or the solution.

Next the principle of the color display by the present device will be elucidated.

The abovementioned styryl-like compounds employed in the present invention have the following molecular structure:

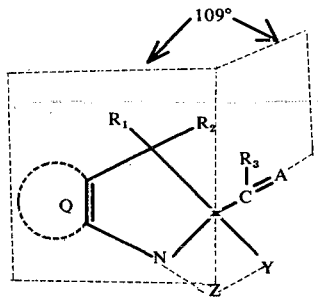

In each of such compounds, its indoline-ring part has an angle of 109° to the styryl structure part and almost all kinds of the compounds have absorptions in the ultraviolet ray region indicating a colorless or pale-yellow appearance. When one of the styryl-like compounds is dissolved in a liquid crystal and the solution is oriented by an electric field, then the styryl compound receives a steric effect, and tends to increase the angle from 109° to 180° opening the ring to display the color, or at least, decreases its activating energy necessary for the ring-opening to display the color. When the electric field is removed, the orientation of the liquid crystal is disturbed, and the styryl-like compound restores the closed-ring colorless structure.

Furthermore, by adding electron-accepting ions or molecules or electron-donating ions or molecules into the solution when the electric field is applied to open the ring and to display the color, then the activating energy necessary to display color becomes smaller and also the color becomes purer. In order to attain easier orientation of the liquid crystal, it is recommended to apply a film of an appropriate orienting agent such as $SiO_2$ on the electrode surface.

In the following, examples of the styryl-like compounds for use in the present invention are shown together with their maximum absorption wavelengths in the closed-ring state and in the open-ring state.

1. 3,3-dimethyl-2-(para-dimethylaminostyryl)indolino[1,2-b]oxazoline

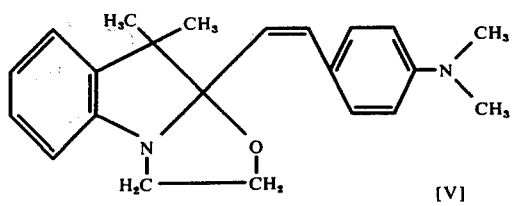

maximum absorption wavelength
at closed ring structure — 296 nm
at open ring structure — 547 nm 2. 3,3-dimethyl-5-methoxy-2-(para-dimethylaminostyryl)indolino[1,2-b]oxazoline

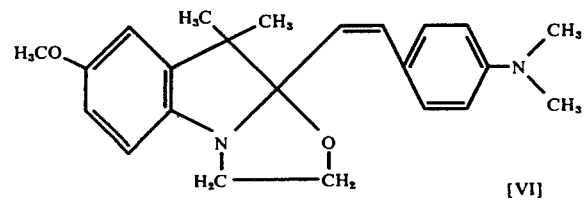

maximum absorption wavelength
at closed ring structure — 297 nm
at open ring structure — 542 nm 3. 3,3-dimethyl-5-nitro-2-(para-dimethylaminostyryl)indolino[1,2-b]oxazoline

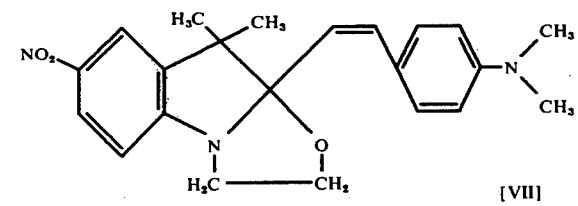

maximum absorption wavelength
at closed ring structure — 303 nm
at open ring structure — 580 nm 4. 3,3,5-trimethyl-2-(para-dimethylaminostyryl)indolino[1,2-b]oxazoline

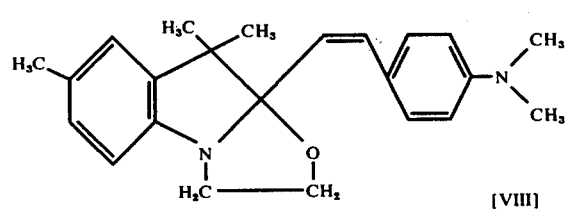

maximum absorption wavelength
at closed ring structure — 297 nm
at open ring structure — 547 nm 5. 3,3-dimethyl-2-(para-chlorostyryl)indolino[1,2-b]oxazoline

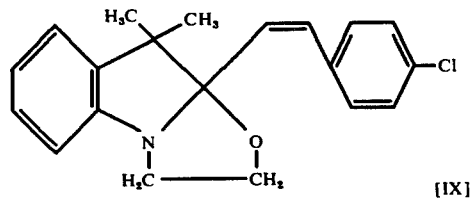

maximum absorption wavelength

-continued

| | |
|---|---|
| at closed ring structure | 259 nm |
| at open ring structure | 392 nm | maximum absorption wavelength
  at closed ring structure — 259 nm
  at open ring structure — 392 nm 6. 3,3-dimethyl-5-chloro-2-(para-chlorostyryl)indolino[1,2-b]oxazoline

[X]

| maximum absorption wavelength | |
|---|---|
| at closed ring structure | 255 nm |
| at open ring structure | 398 nm | maximum absorption wavelength
  at closed ring structure — 255 nm
  at open ring structure — 398 nm 7. 3,3-dimethyl-5-chloro-2-(para-dimethylaminostyryl)indolino[1,2-b]oxazoline

[XI]

| maximum absorption wavelength | |
|---|---|
| at closed ring structure | 299 nm |
| at open ring structure | 557 nm | maximum absorption wavelength
  at closed ring structure — 299 nm
  at open ring structure — 557 nm 8. 3,3-dimethyl-5-iodo-2-(para-dimethylaminostyryl)indolino[1,2-b]oxazoline

[XII]

-continued

| maximum absorption wavelength | |
|---|---|
| at closed ring structure | 298 nm |
| at open ring structure | 561 nm | maximum absorption wavelength
  at closed ring structure — 298 nm
  at open ring structure — 561 nm 9. 3,3-dimethyl-4,5-benzo-2-(para-dimethylaminostyryl)indolino[1,2-b]oxazoline

[XIII]

| maximum absorption wavelength | |
|---|---|
| at closed ring structure | 298 nm |
| at open ring structure | 560 nm | maximum absorption wavelength
  at closed ring structure — 298 nm
  at open ring structure — 560 nm 10. 3,3-dimethyl-4,5-benzo-2-(para-dimethylaminostyryl)indolino[1,2-b]-1,3-tetrahydroxazine

[XIV]

| maximum absorption wavelength | |
|---|---|
| at closed ring structure | 304 nm |
| at open ring structure | 564 nm | maximum absorption wavelength
  at closed ring structure — 304 nm
  at open ring structure — 564 nm 11. 3,3-dimethyl-2-(para-dimethylaminocinnamylidenevinyl)indolino[1,2-b]oxazoline

[XV]

| maximum absorption wavelength | |
|---|---|
| at closed ring structure | 328 nm |
| at open ring structure | 618 nm | maximum absorption wavelength at closed ring structure — 328 nm
at open ring structure — 618 nm 12. 3,3-dimethyl-5-chloro-2-(para-dimethylaminocinnamylidenevinyl)indolino[1,2-b]oxazoline

[XVI]

maximum absorption wavelength
at closed ring structure   338 nm
at open ring structure     635 nm maximum absorption wavelength
at closed ring structure — 338 nm
at open ring structure — 635 nm 13. 3,3-dimethyl-5-methoxy-2-(para-dimethylaminocinnamylidenevinyl)[1,2-b]oxazoline

[XVII]

maximum absorption wavelength
at closed ring structure   326 nm
at open ring structure     594 nm maximum absorption wavelength
at closed ring structure — 326 nm
at open ring structure — 594 nm 14. 3,3-dimethyl-2-(para-dimethylamino-2-azastyryl)indolino[1,2-b]oxazoline

[XVIII]

maximum absorption wavelength
at closed ring structure   290 nm
at open ring structure     587 nm maximum absorption wavelength
at closed ring structure — 290 nm
at open ring structure — 587 nm 15. 3,3-dimethyl-5-methoxy-2-(para-dimethylamino-2-azastyryl)indolino[1,2-b]oxazoline

[XIX]

maximum
at closed ring structure     271 nm
at open ring structure       589 nm maximum absorption wavelength
at closed ring structure — 271 nm
at open ring structure — 589 nm 16. 3,3-dimethyl-5-chloro-2-(para-dimethylamino-2-azastyryl)indolino[1,2-b]oxazoline

[XX]

maximum absorption wavelength
at closed ring structure     301 nm
at open ring structure       600 nm maximum absorption wavelength
at closed ring structure — 301 nm
at open ring structure — 600 nm 17. 3,3-dimethyl-2-(para-methoxystyryl)indolino[1,2-b]-1,3-tetrahydroxazine

[XXI]

maximum absorption wavelength
at closed ring structure    264 nm

-continued at open ring structure     423 nm maximum absorption wavelength
  at closed ring structure — 264 nm
  at open ring structure — 423 nm 18. 3,3-dimethyl-5-chloro-2-(para-dimethylaminostyryl)indolino[1,2-b]-thiazoline

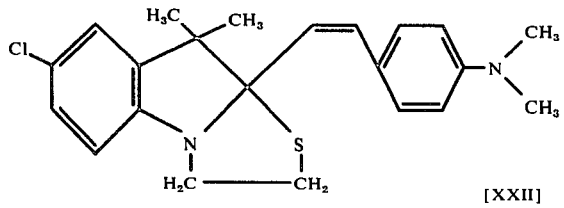

[XXII]

maximum absorption wavelength
at closed ring structure     408 to 410 nm
at open ring structure       538 to 540 nm maximum absorption wavelength
  at closed ring structure — 408 to 410 nm
  at open ring structure — 538 to 540 nm 19. 3,3-dimethyl-2-{2-(9-methylcarbazolyl)-vinyl}-indolino[1,2-b]oxazoline

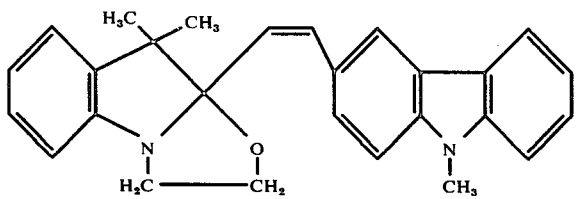

[XXIII]

maximum absorption wavelength
at closed ring structure     284 to 285 nm
at open ring structure       500 to 502 nm maximum absorption wavelength
  at closed ring structure — 284 to 285 nm
  at open ring structure — 500 to 502 nm Next, examples of the present invention are described.

Example 1

A display cell as shown in FIG. 1 is made by filling the solution, which is formed by dissolving 3,3-dimethyl-2-(paradimethylaminostyryl)indolino[1,2-b]oxazoline indicated by the formula [V] as the color changing dye in p-methoxybenzylidene-p'-n-butylaniline (MBBA) as the liquid crystal at the concentration of $1 \times 10^{-2}$ mol/l, into a glass cell having a transparent electric conductive film. In FIG. 1, numeral 1 indicates the solution prepared by dissolving the dye into the liquid crystal, numerals 2,2 indicate the transparent electric films such as of $In_2O_3$ or $SnO_2$, numerals 3,3 indicate glass plates, and numerals 4,4 indicate a spacer disposed between the edge parts of the glass plates, 3,3 to surround the space between the glass plates so as to form the glass cell. Either one of the electrodes 2,2 may be opaque. In other words, it is sufficient that at least one of the electrodes 2,2 is transparent.

In the abovementioned example, if an appropriate amount selected in the range of $10^{-4}$ to 1 mol/l of ions such as $H^+$ and $Cl^-$ dissociated from HCl, $B^{+3}$ and $Cl^-$ dissociated from $BCl_3$ or ions obtained from a pyridium salt is contained in the liquid crystal solution, then regions are formed in a dynamic scattering manner and therefore a light scattering in the liquid crystal arises. At the same time molecules of the liquid crystal are oriented in the direction of the ion flows, and therefore, by means of the steric effect of the dye molecules, the abovementioned angle (109°) in the dye molecules is caused to be increased, the activation energy for color display decreases and the dye displays color. Accordingly, at the application of the electric field to the solution, the abovementioned dye shows the absorption at 550 nm at application. The preferred electric field is about $10^4$ Volt/cm. Thus, the solution displays bright color as the result of the abovementioned light scattering by the dynamic scattering mode and by the color display of the dye.

By removing the applied electric field, the color disappears.

In the present invention, the liquid crystal is colored by the dye, and accordingly, when the electric field is applied to the liquid crystal solution, the dye displays a clear bright color by its specified absorption of nonpolarized, i.e., full rays, instead of by scattered light or polarized light as in the abovementioned conventional liquid crystal device. Therefore, the present device has a much higher contrast than the conventional simple liquid crystal display device. Moreover, since the present device displays by the absorption of nonpolarized rays, there is no need for observing from a limited view angle.

EXAMPLE 2

To solution used in the Example 1, $1 \times 10^{-2}$ mol/l of dodecylpyridiniumchloride as cation surface active agent for improving the dynamic scattering and the orientation of the liquid crystal, $10^{-1}$ mol/l of p-benzoquinone and $10^{-1}$ mol/l of hydroquinone as stabilizing agents for stabilizing the solution against deterioration are added. Thereupon color purity of the dye is improved to such an extent that light absorption as high as 10 times that of Example 1 takes place, and the device shows clear red color.

In this case, since the color is displayed by absorption of the dye instead of by the scattered light from the liquid crystal, the contrast between the electrified state (by applying the electric field of $10^3$ to $10^5$ V/cm and the non-electrified state is as high as 60:1. The color disappears when the electric field is removed.

EXAMPLE 3

Figure 2:
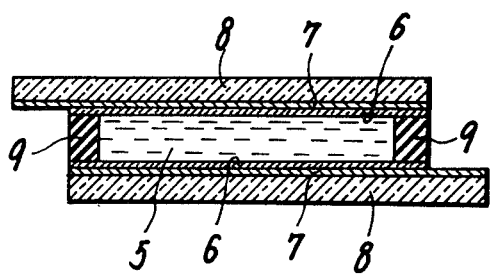
FIG. 2 is a sectional sideview of another example of the color display device embodying the present invention.

3,3,5-trimethyl-2-(para-dimethylaminostyryl)indolino[1,2-b]oxazoline indicated by the formula [VIII-]as the color changing dye is dissolved in P-ethoxybenzylidene-P'-aminobenzonitrile as the liquid crystal at the concentration of $1 \times 10^{-2}$ mol/l. The resultant solution is then filled in the glass cell shown in FIG. 2. In FIG. 2, numeral 5 indicates the solution prepared by dissolving the dye into the liquid crystal, numerals 6,6 indicate dielectric films of an orientating agent such as $SiO_2$, numerals 7,7 indicate transparent electrode films, numerals 8,8 indicate glass plates and numerals 9,9 indicate a spacer disposed between the edge parts of the glass plates 8,8 so as to surround the space between the glass plates thereby to form the glass cell. As a variation, the dielectric films 6,6 may be formed on either one of the electrodes 7,7.

The above mentioned device displays color when an appropriate electric field between $10^3$ to $10^5$ Volt/cm is applied across the electrodes. The optimum electric field is around $10^4$ Volt/cm. In this example, like the previous examples, the liquid crystal is colored by the dye, and accordingly, when the electric field is applied to the solution, the liquid crystal is oriented in the direction of the electric field, and the dye is affected so as to open the angle in its molecular structure, and accordingly the dye displays color by its specified absorption. The color display is not made by simple scattered light but is made by light absorption of the dye, and therefore, the present device has a higher contrast than the conventional device, and has no restriction to observing the display from a limited view angle, and moreover, there is no need of employing a polarizing prism or filter to observe the color display. By adding such appropriate additives as quinones as stabilizers and surface active agents as mentioned in previous Example 2, the contrast of the electrified state against the non-electrified state is very much improved to attain a value as high as 60:1. In this example, since the orientating agent films 6,6 are employed to orient the liquid crystal in the non-electrified state, there is no need of containing the ion-donating agent.

As described in the above, in the device of the present invention, addition to the liquid crystal solution of suitable surface active agents such as dodecylpyridiniumchloride or cetylpyridiniumbromide or lauryldimethylbenzlammonium-p-toluenesulfonate, suitable stabilizing agents such as p-benzoquinone, phenols such as hydroquinone, phenol or cresol, and/or molecules of electron-donating or proton-donating nature such as HCl, $BCl_3$ or pyridinium salts or ammonium salts, etc., are effective for improving the contrast and color purity. According to empirical study, the concentration of the total additive should be between $1 \times 10^{-4}$ mol/l to the solution in order to attain good results, and the optimum result is obtainable for the concentration of between $10^{-3}$ of $10^{-2}$ mol/l to the solution.

When the concentration of the additive exceeds 1 mol/l, the additive deposits, thereby decreasing the contrast. When the concentration is under $10^{-4}$ mol/l, the effects of the additive are not obtainable.

When the concentration of the additive is higher than $10^{-2}$ mol/l, the solution is colored even in the absence of the electric field, thereby decreasing the contrast. When the concentration is lower than $10^{-3}$ mol/l, the color obtained by the electric field becomes pale.

The orientation agent films such as $SiO_2$ serve to orient the molecules of the solution when the electric field is removed. The films serve also as insulating films to isolate the solution from the transparent electrode so as to eliminate D.C. current from flowing across the electrode. As the orientation agent film, $SiO_2$, $TiO_2$, MgO, S:N, TiN, or PbO can be employed, also.

The intensity of the electric field to be applied across the solution should be between $1 \times 10^3$ and $1 \times 10^5$ Volt/cm, and the optimum value is around $1 \times 10^4$ Volt/cm.

As has been described in the above, the color display device of the present invention displays color according to the principle of displaying the color of dyes by means of orientation of the liquid crystal by the electric field. The device of the present invention has the advantages that contrasts of the electrified states to the non-electrified states are high, the viewing angle is not limited and the color is pure.

What I claim is:

1. A color display device comprising a pair of electrodes which are disposed with a specified space therebetween, at least one of said electrodes being transparent, and a solution filled in the space, wherein the improvement is that the solution includes a liquid crystal and dissolved therein a styryl-like color-changing dye represented by the chemical formula:

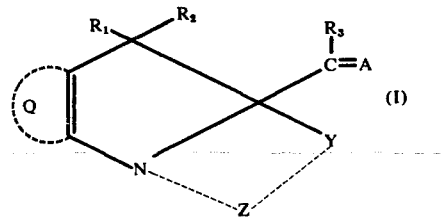

wherein Q represents a benzene ring with or without substituted radicals or Q represents

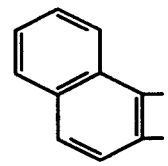

$R_1$ and $R_2$ represent a member selected from the group consisting of lower alkyl radicals, hydroxy-alkyl radicals and alkoxy-alkyl radicals; $R_3$ represents a member selected from the group consisting of hydrogen, alkyl radicals, alkoxy-radicals, halogen, a nitrile radical, aromatic radicals and phenoxy radicals, Y represents a member selected from the group consisting of oxygen and sulfur; Z represents an unsubstituted or alkyl substituted alkylene radical of 2 to 4 carbon atoms which alkylene radical forms a ring structure together with

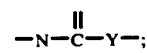

and A represents the radical formed when said dye is produced by a condensation reaction of the methyl radical or methylene radical in the 2- position of a precursor indoline derivative represented by the formula:

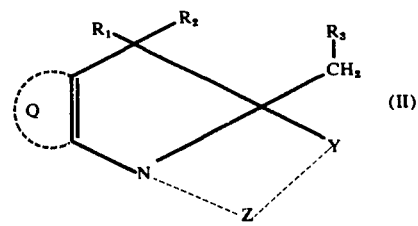

where Q, $R_1$, $R_2$, $R_3$, Y and Z are defined as in formula (I) above with a member selected from the group consisting of aromatic aldehydes, heterocyclic aldehydes, aromatic nitroso compounds and heterocyclic nitroso compounds.

2. A color display device according to claim 1 wherein the liquid crystal solution further contains at least one surface active agent.

3. A color display device according to claim 1 wherein at least one of said electrodes has a coating of a film of a dielectric substance which is disposed to isolate said electrode from the liquid crystal solution.

4. A color display device according to claim 1 wherein the liquid crystal solution further contains a stabilizing agent selected from the group consisting of phenols and quinones.

5. A color display device according to claim 2 wherein the liquid crystal solution further contains a stabilizing agent selected from the group consisting of phenols and quinones.

6. A color display device according to claim 2 wherein the concentration of said surface active agent is between $1 \times 10^{-4}$ and 1 mol/l of liquid crystal solution.

7. A color display device according to claim 4 wherein the concentration of said stabilizing agent is between $1 \times 10^{-3}$ and $1 \times 10^{-2}$ mol/l of liquid crystal solution.

* * * * *